United States Patent
Oh et al.

(10) Patent No.: US 11,433,943 B2
(45) Date of Patent: Sep. 6, 2022

(54) HITCH ANGLE DETECTION USING AUTOMOTIVE RADAR

(71) Applicant: Ford Global Technologies, LLC, Dearborn, MI (US)

(72) Inventors: Jinhyoung Oh, Fremont, CA (US); Saeid Nooshabadi, Houghton, MI (US); Mohsen Lakehal-ayat, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 16/671,232

(22) Filed: Nov. 1, 2019

(65) Prior Publication Data

US 2021/0129906 A1 May 6, 2021

(51) Int. Cl.
*B62D 15/02* (2006.01)
*G01S 13/93* (2020.01)
*G01S 13/931* (2020.01)

(52) U.S. Cl.
CPC ......... *B62D 15/025* (2013.01); *B62D 15/029* (2013.01); *G01S 13/931* (2013.01); *G01S 2013/9318* (2020.01); *G01S 2013/93272* (2020.01)

(58) Field of Classification Search
None
See application file for complete search history.

(56) References Cited

U.S. PATENT DOCUMENTS

| | | |
|---|---|---|
| 6,480,104 B1 | 11/2002 | Wall et al. |
| 6,970,184 B2 | 11/2005 | Hirama et al. |
| 7,171,769 B2 | 2/2007 | Schultz et al. |
| 9,108,598 B2 | 8/2015 | Headley |
| 9,238,483 B2 * | 1/2016 | Hafner ................... B60D 1/245 |
| 9,335,162 B2 | 5/2016 | Kyrtsos et al. |
| 9,499,018 B2 | 11/2016 | Gehrke et al. |
| 10,035,457 B2 | 7/2018 | Singh et al. |
| 10,529,238 B2 * | 1/2020 | Gesch ................... B60R 1/0612 |
| 2012/0283909 A1 | 11/2012 | Dix |
| 2013/0226390 A1 | 8/2013 | Luo et al. |
| 2014/0012465 A1 | 1/2014 | Shank et al. |
| 2014/0358417 A1 | 12/2014 | Lavoie et al. |

(Continued)

FOREIGN PATENT DOCUMENTS

EP 2682329 A1 1/2014

*Primary Examiner* — Aniss Chad
*Assistant Examiner* — Madison R Hughes
(74) *Attorney, Agent, or Firm* — Gregory P. Brown; Price Heneveld LLP

(57) ABSTRACT

A trailer detection system for a vehicle includes a radar system outputting object point location data to a rear of the vehicle and a controller. The controller receives the object point location data and determines a position of an edge of the trailer relative to the vehicle by processing the object point location data from the radar system at a reduced threshold relative to use of the data in detecting a vehicle and filters out object point location data not correlated with the edge of the trailer based on object point location data persistence during driving of the vehicle. The controller further correlates the determined position of the edge of the trailer relative to the vehicle to determine an angle of the trailer relative to the vehicle about a coupling point.

18 Claims, 8 Drawing Sheets

(56) References Cited

U.S. PATENT DOCUMENTS

| | | |
|---|---|---|
| 2016/0272024 A1 | 9/2016 | Bochenek et al. |
| 2016/0288601 A1 | 10/2016 | Gehrke et al. |
| 2016/0375831 A1 | 12/2016 | Wang et al. |
| 2018/0118199 A1* | 5/2018 | Chaney, Jr ............ B60W 10/20 |
| 2018/0121742 A1* | 5/2018 | Son ........................ B62D 13/06 |
| 2018/0356214 A1* | 12/2018 | Kozak .................... G01S 17/06 |
| 2019/0302764 A1* | 10/2019 | Smith ................... G05D 1/0061 |
| 2019/0337344 A1* | 11/2019 | Yu ........................ B62D 15/026 |
| 2021/0027490 A1* | 1/2021 | Taiana ................... B62D 13/06 |

* cited by examiner

HITCH ANGLE DETECTION USING AUTOMOTIVE RADAR

FIELD OF THE INVENTION

The disclosure made herein relates generally to steering assist technologies in vehicles and, more particularly, to a hitch angle detection process using automotive radars in a trailer backup assistance system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor that determines a steering input for the vehicle based on an input trailer curvature path and determined a hitch angle. Both the hitch angle determination and the steering input determination require use of a kinematic model of the combined trailer and vehicle that includes both the length of the trailer, more particularly, from the point of attachment with the vehicle to the front axle thereof and an angle between the vehicle and the trailer at that point of attachment. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accuracy of the trailer-vehicle angle (also referred to as the "hitch angle") is similarly important in determining the kinematic relationship. Accordingly, improvements related to automated system estimation of trailer length and hitch angle in an accurate manner may be desired.

SUMMARY OF THE INVENTION

According to one aspect of the present disclosure, trailer detection system for a vehicle includes a radar system outputting object point location data to a rear of the vehicle and a controller. The controller receives the object point location data and determines a position of an edge of the trailer relative to the vehicle by processing the object point location data from the radar system at a reduced threshold relative to use of the data in detecting a vehicle and filters out object point location data not correlated with the edge of the trailer based on object point location data persistence during driving of the vehicle. The controller further correlates the determined position of the edge of the trailer relative to the vehicle to determine an angle of the trailer relative to the vehicle about a coupling point.

Embodiments of the first aspect of the invention can include any one or a combination of the following features:
- the system further includes a vehicle steering system, the trailer detection system is incorporated in a system for assisting in reversing the vehicle when the trailer is coupled with the vehicle, and the controller further controls the steering system of the vehicle using the angle of the trailer in a kinematic model of the vehicle and trailer combination to maintain the vehicle along a backing path;
- the backing path includes at least one segment corresponding with a curvature path of the vehicle and trailer;
- the radar system includes a first radar unit mounted on a rear of the vehicle;
- the first radar unit is mounted on a right side of the rear of the vehicle, and the radar system further includes a second radar unit mounted on a left side of the rear of the vehicle;
- the controller detects points along the edge of the trailer using the first and second radars, establishes locations of the points within first and second coordinate systems associated respectively with the first and second radars, and uses the locations of the points within the first and second coordinate systems to establish locations for the points in a third coordinate system aligned with a hitch ball of the vehicle;
- at least the first and second coordinate systems are population grids;
- the controller correlates the determined position of the edge of the trailer relative to the vehicle to determine the angle of the trailer relative to the vehicle about the coupling point by populating a first matrix of static object location points corresponding with the edge of the trailer relative to the vehicle when the angle is known to be zero, continuing to receive the object point location data and determining the position of the edge of the trailer relative to the vehicle when the angle is not known to be zero and populating a second matrix of dynamic object location points corresponding with the edge of the trailer relative to the vehicle, and using the first and second matrices to calculate a rotation matrix for the static rotation points to the dynamic rotation points.
- the rotation matrix is processed to derive the angle; and
- the controller receives the object point location data and determines the position of the edge of the trailer relative to the vehicle and correlates the determined position of the edge of the trailer relative to the vehicle to determine the angle of the trailer relative to the vehicle during forward driving at a vehicle speed of less than 10 miles per hour.

According to another aspect of the present disclosure, a method for determining a trailer position relative to a vehicle includes receiving object point location data from a radar system and determining a position of an edge of the trailer relative to the vehicle by processing the object point location data from the radar system at a reduced threshold relative to use of the data in detecting a vehicle and filtering out object point location data not correlated with the edge of the trailer based on object point location data persistence during driving of the vehicle. The method further includes correlating the determined position of the edge of the trailer relative to the vehicle to determine an angle of the trailer relative to the vehicle about a coupling point.

According to another aspect of the present disclosure, a vehicle includes a radar system outputting object point location data to a rear of the vehicle and a controller. The controller receives the object point location data and determining the position of an edge of the trailer relative to the vehicle by processing the object point location data from the radar system at a reduced threshold relative to use of the data in detecting a vehicle and filters out object point location data not correlated with the edge of the trailer based on object point location data persistence during driving of the vehicle. The controller further correlates the determined position of the edge of the trailer relative to the vehicle to determine an angle of the trailer relative to the vehicle about a coupling point.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
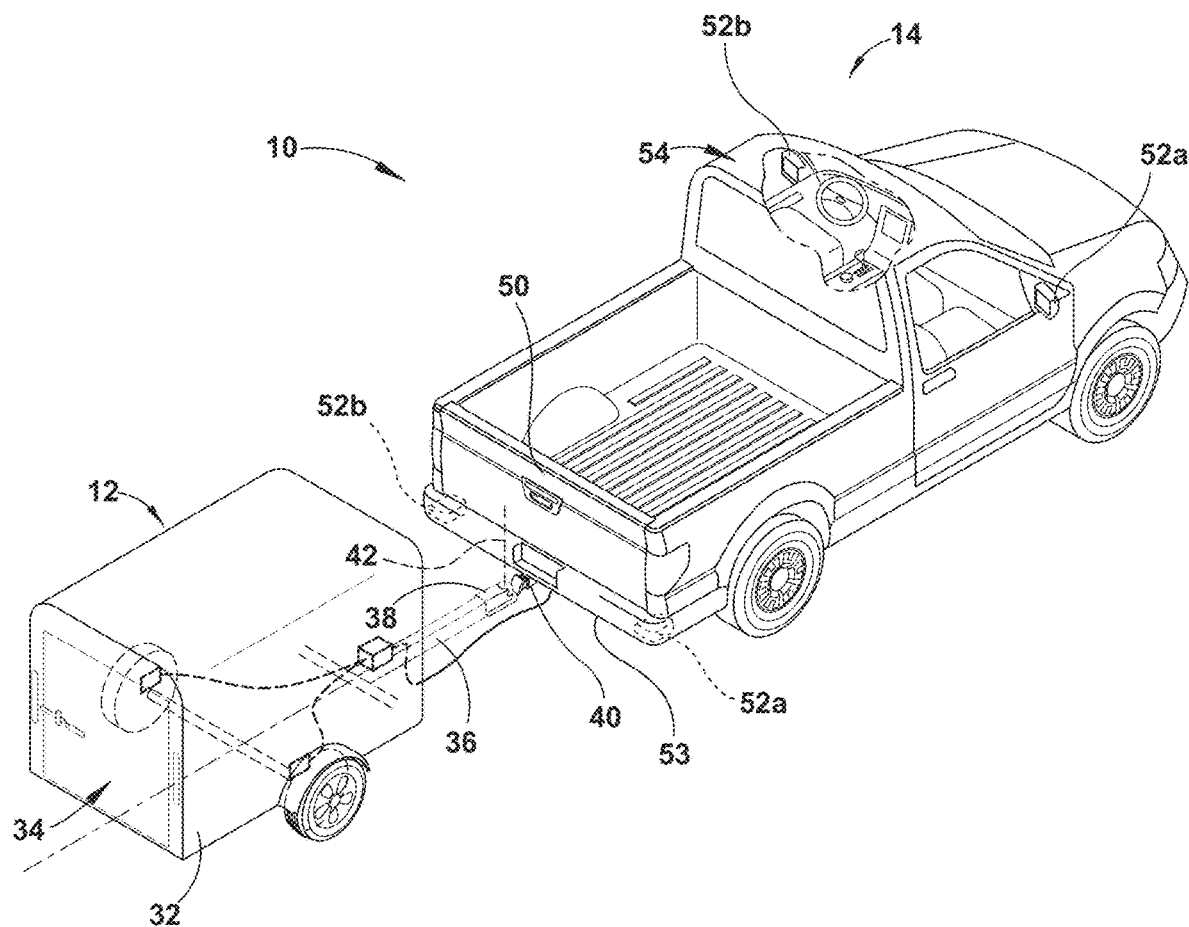
FIG. 1 is a top perspective view of a vehicle attached to a trailer.
Figure 2:
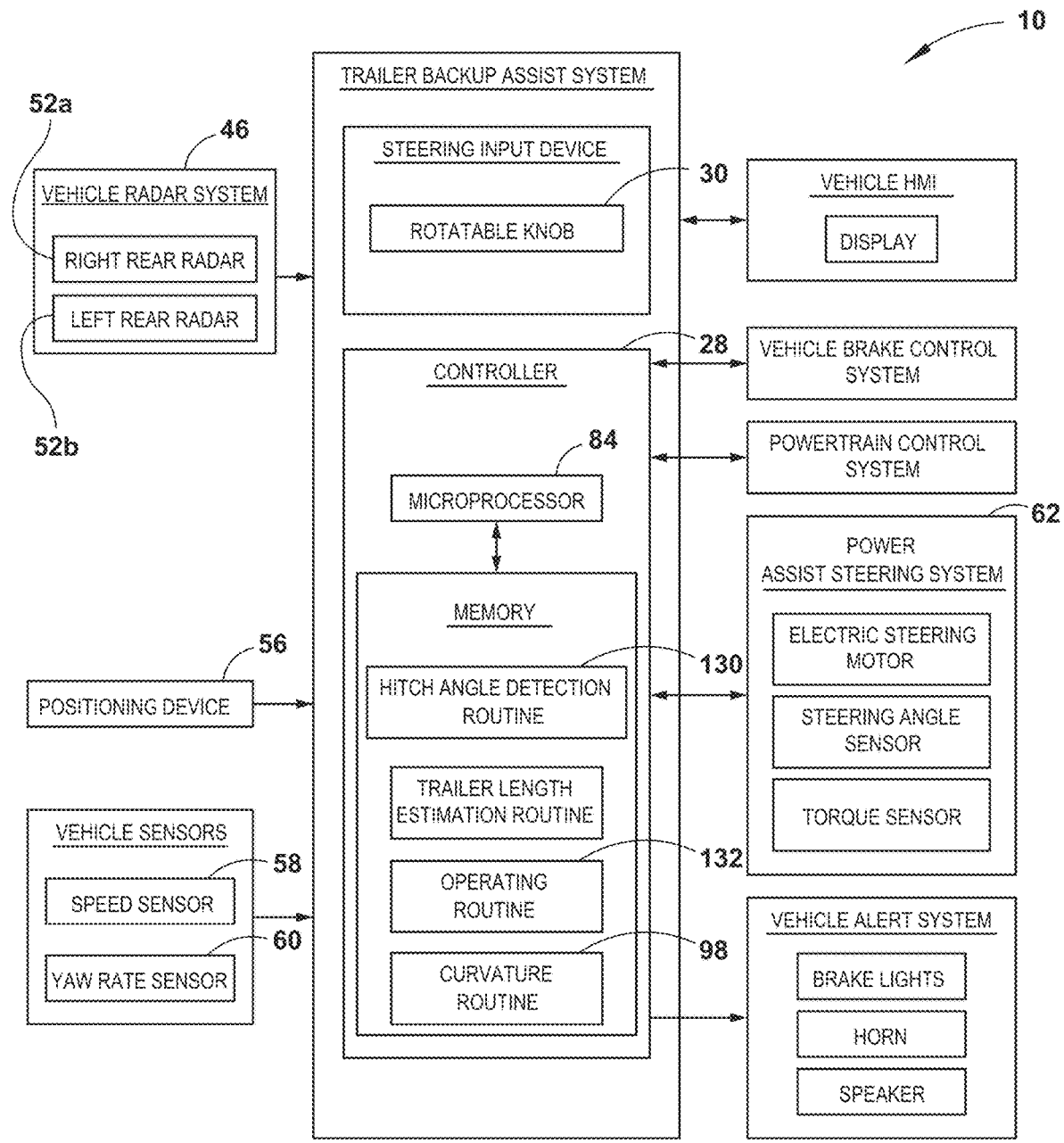
FIG. 2 is a block diagram illustrating an example vehicle control system with a radar-based trailer angle detection system according to one embodiment of the disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-11, reference numeral 10 generally designates a trailer 12 detection system 10 for a vehicle 14 that includes a radar system 46 outputting object point location data relative to a rear of the vehicle 14 and a controller 28. The controller 28 receives the object point location data and determines a position of an edge 90 of the trailer 12 relative to the vehicle 14 by processing the object point location data from the radar system 46 at a reduced threshold relative to use of the data in detecting a vehicle and filters out object point location data not correlated with the edge 90 of the trailer based on object point location data persistence during driving of the vehicle. The controller further correlates the determined position of the edge 90 of the trailer 12 relative to the vehicle 14 to determine an angle γ of the trailer 12 relative to the vehicle 14 about a coupling point 42.

In one example, the determined trailer angle γ and the process for the detection of the same is useable as an aspect of the system 10 that includes functionality for controlling a backing path of the trailer 12 when attached to the vehicle 14. In such an example, the system 10 can implement such control by allowing a driver of the vehicle 14 to specify a desired curvature of the backing path of the trailer 12. The controller 28, in addition to determining the trailer angle γ, as discussed above, controls a steering system 62 of the vehicle 14 using the angle γ of the trailer 12 in a kinematic model of the vehicle 14 and trailer 12 combination to maintain the vehicle 14 along a backing path.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

As mentioned above and shown in FIG. 2, system 10 may also include a radar system 46 used for determining the hitch angle γ between the vehicle 14 and the trailer 12. The illustrated hitch radar system 46 employs two radar units 52a, 52b that may be located along respective sides (i.e., right and left) of vehicle 14 and may be positioned within the bumper 53 on the rear of vehicle 14 such that they are generally concealed from view. Alternatively, a single radar located centrally may be utilized. The depicted dual-side radar, however, may be preferable, as the radars 52a, 52b can act together, as described further below to provide more accurate trailer 12 edge 90a, 90b detection.

Figure 3:
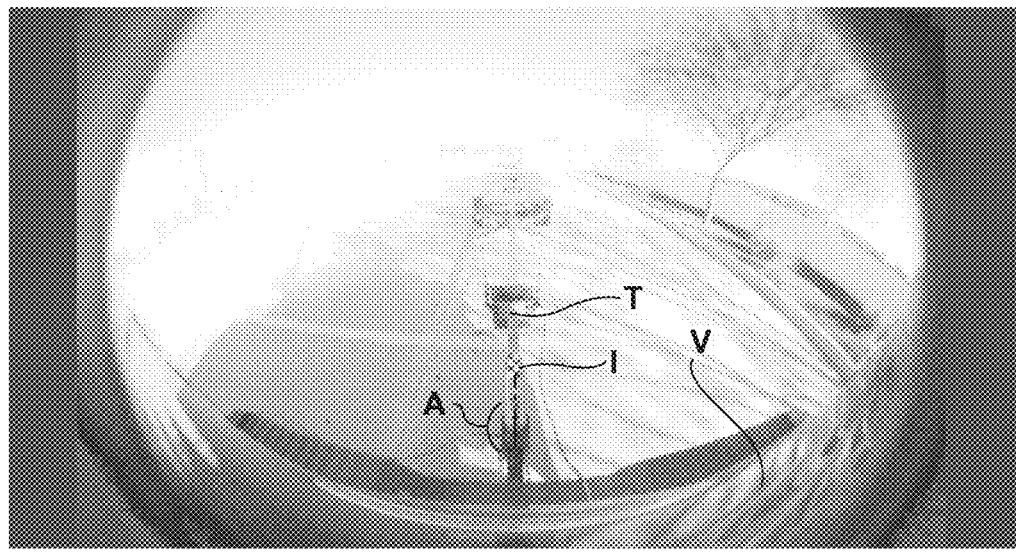
FIG. 3 is a perspective view of a related art system that uses camera image data to determine an angle of a trailer relative to a vehicle.

With reference to FIG. 3, a related art system is shown that uses computer vision techniques, such as edge 90a, 90b detection, background subtraction, and template matching to determine the position of the trailer T and or a target image I on a specified portion of the trailer T within an image received from a camera (which can include rear camera 50, as shown in FIG. 1). The image data must then be correlated with the positioning of the camera and its attributes to arrive at positioning of the detected trailer T with respect to the vehicle to determine the hitch angle A. The utilized image processing techniques may involve multiple factors that impact the accuracy thereof in detecting the trailer T and/or target image I and correlating it to real world coordinates with reference to the vehicle V. These factors may include available ambient lighting, the presence of shadows S (as shown in FIG. 3, for example), textured surfaces, noise, and camera exposure (sensitivity or settings). These limitations may be difficult to overcome with the image processing techniques used for the utilized equipment and components. Accordingly, such systems may not provide consistent performance in generalized scenarios.

As discussed above, the present system 10 provides a hitch angle detection routine 130 that is based on measurements and data obtained from the vehicle radar system 46. In the example depicted in FIGS. 1 and 2, the system 10 is in communication with both the rear-right 52a and rear-left 52b radar units included within the depicted vehicle 14. In other examples, it may be possible to utilize measurements and data from a single rear-mounted radar unit. In either example, the system 10 may leverage radar units already installed in the vehicle 14, including for so-called advanced driver assistance systems ("ADAS") features or for autonomous driving systems or functionality. As an initial step, the hitch angle detection routine 130 constructs a baseline trailer edge 90 map relative to vehicle 14. To establish this baseline, system 10 requests that the driver drive forward in a straight direction at a low speed, between (between 5 and 10 mph, for example). This slow forward maneuver causes the hitch angle γ angle to be close to zero, such that it can be consistently reasonably estimated at zero. Because the hitch angle γ can also be assumed static (by discounting minor fluctuations as insignificant over time), the straight driving maneuver also ensures that the trailer 12 position relative to vehicle 14 is governed by the first-order linear ordinary differential equation:

$$\dot{\gamma} = \omega_1 - \omega_2, \text{ where} \quad (1)$$

$\omega_1$ is the vehicle yaw rate; and
$\omega_2$ is the trailer yaw rate.
Equation 1 can be rewritten according to the kinematic relationship shown in FIG. 11 (discussed further below) as:

$$\dot{\gamma} = v_1 \frac{\sin\gamma}{D} - v_1 \frac{\tan\delta}{W} \frac{L\cos\gamma}{D} - v_1 \frac{\tan\delta}{W}. \quad (2)$$

Figure 4:
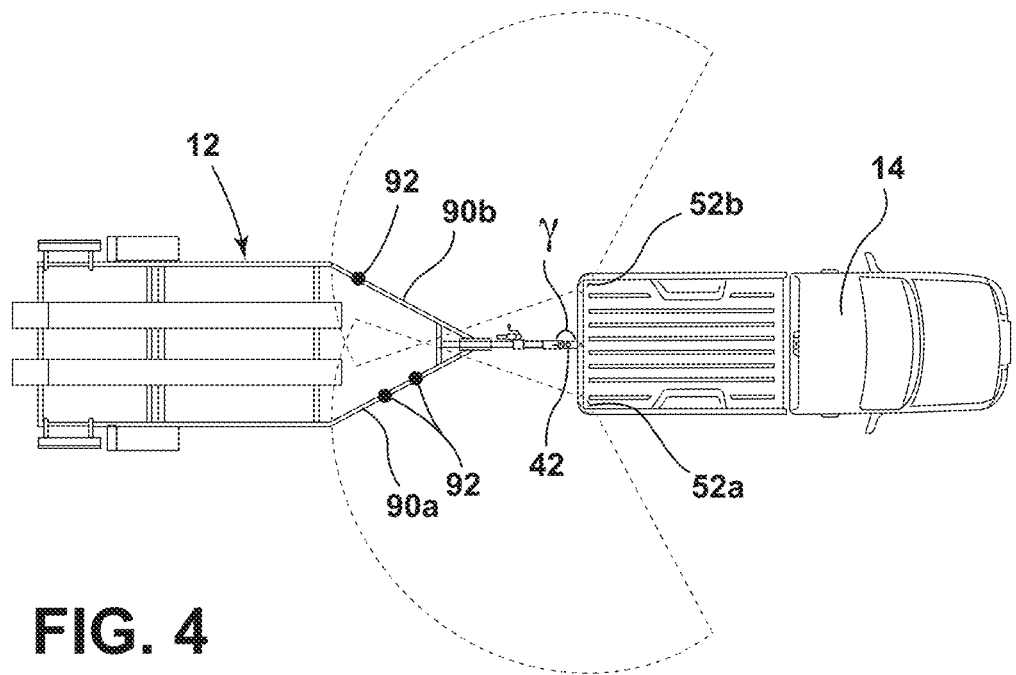
FIG. 4 is an overhead schematic view of trailer edge point detection using vehicle radar units according to a first step in a sequence of using the edge point detection to determine the angle of the trailer relative to the vehicle.

When it can be inferred, such as by an acceptably low steering angle δ over time (a time-derivative of the steering angle over a predetermined interval being sufficiently close to zero), that the hitch angle γ is close to zero such that it can be determined by the linear equation (2), the system 10, according to hitch angle detection routine 130, adjusts the detection thresholds of rear radars 52a, 52b. This is carried out because, in automotive applications the detection thresholds of radars, including rear radars 52a, 52b may be optimized for detection of vehicles, people, and other objects with a generally large surface area open to vehicle 14, which is such that trailer 12 edges 90 may not be detectable with sufficient data for use in hitch angle γ estimation. As shown in FIG. 4, the use of rear radars 52a, 52b in a detection scheme optimized in this manner may be able to detect only several points 92 on the trailer 12. To increase the detection of points 92 on the trailer 12, the hitch angle detection routine 130 causes system 10 to lower the detection threshold for the data from at least rear radars 52a, 52b until the trailer 12 is detected with a sufficient number of points 92.

Figure 5:
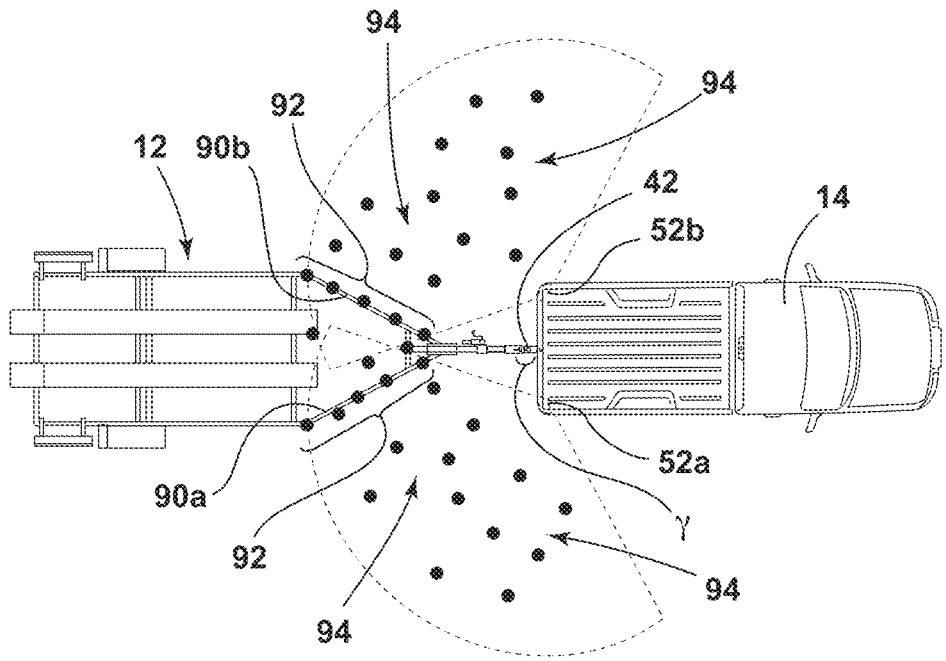
FIGS. 5-10 are overhead schematic views of subsequent steps in the sequence of using trailer edge point detection by vehicle radar units to determine the angle of the trailer relative to the vehicle.
Figure 6:
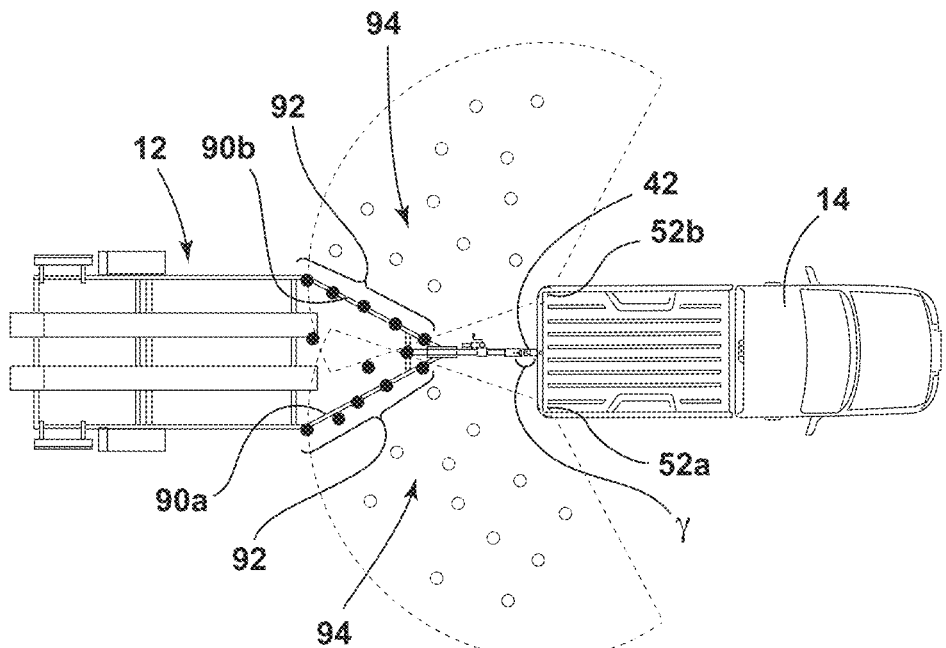
Figure 10:
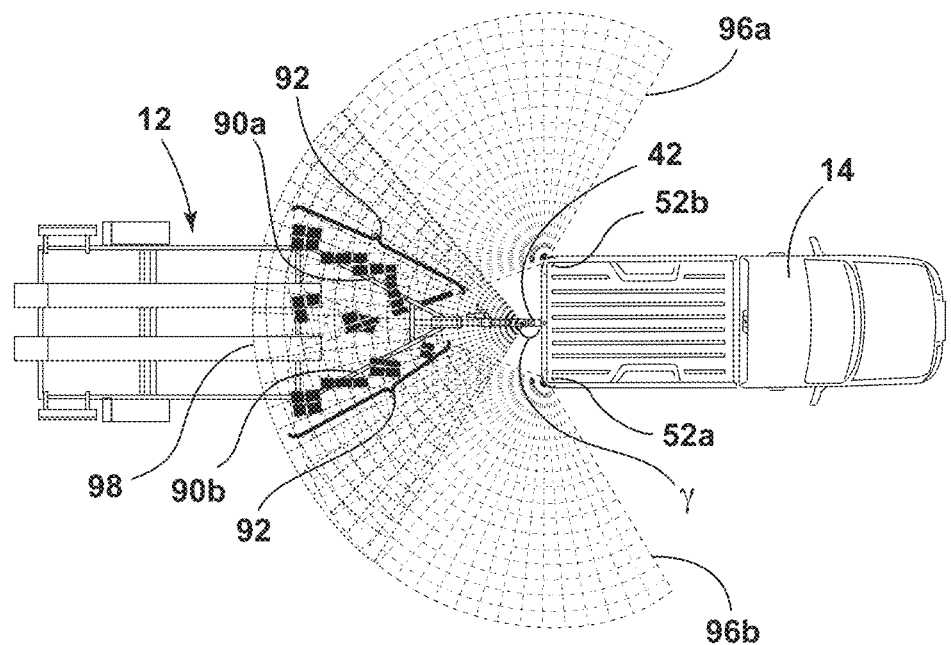

In one aspect, hitch angle detection routine 130 can be further implemented to account for false positive detections 94 that may increase due to the lowered detection threshold, shown in FIG. 5. In this manner, hitch angle detection routine 130 leverages the fact that the appearance of the false positive detections 94 may be generally random and not consistent over time, while detections 92 from the actual trailer 12 are generally more consistent. The false positive detections 94 vary because the ground reflection, which may cause some false positive detections 94, changes as the vehicle 14 moves in the slow forward maneuver. Similarly, electromagnetic noises causing additional false positive detections 94 are mostly random. The random appearance of the false positive detections 94 and consistent appearance of trailer detections 92 can allow hitch angle detection routine 130 to distinguish false positive detections 94 and actual positive detections 92, as shown in FIG. 10.

Figure 7:
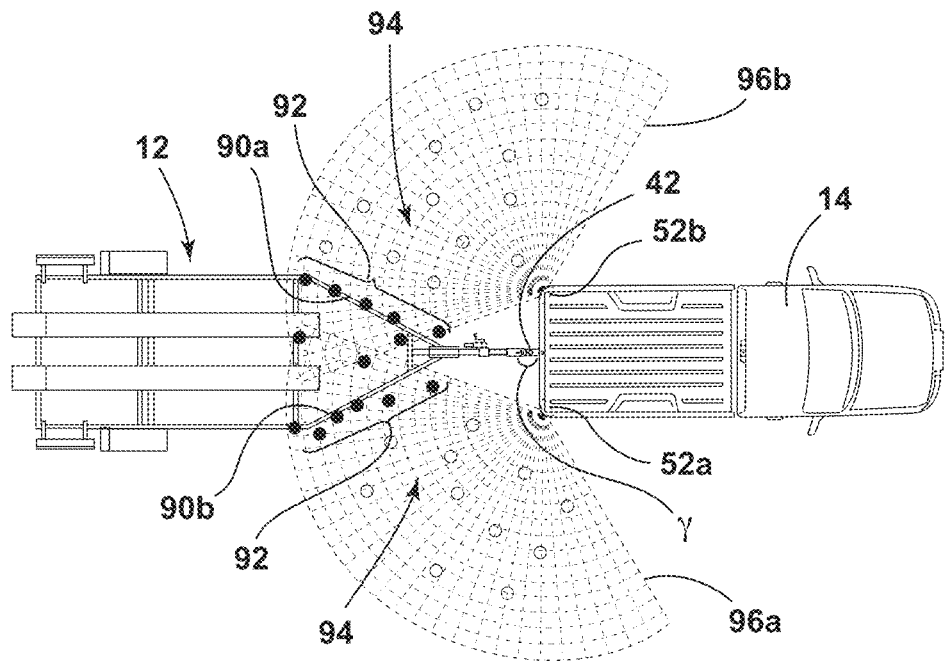
Figure 8:
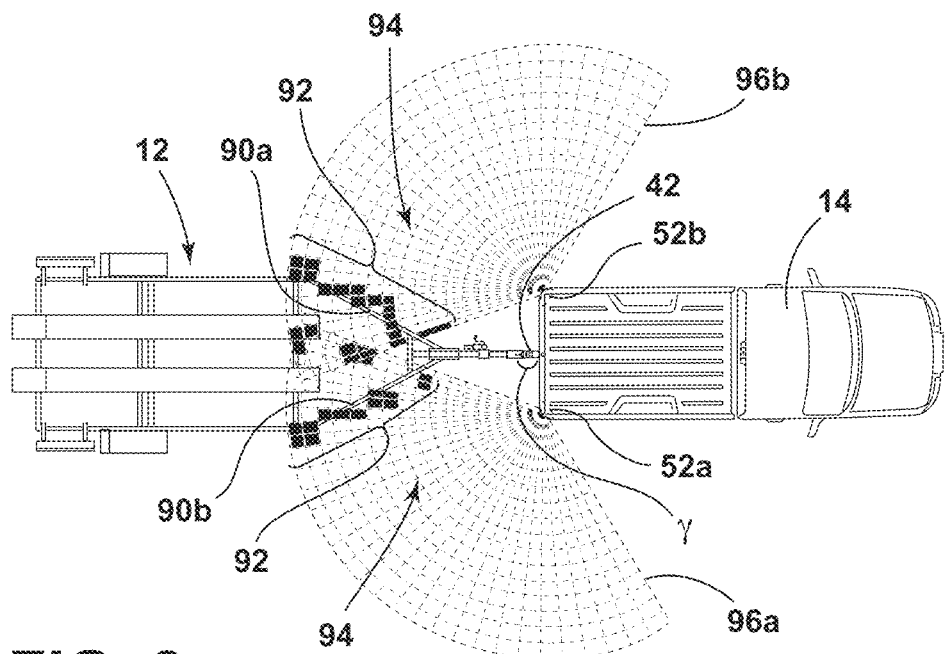
Figure 9:
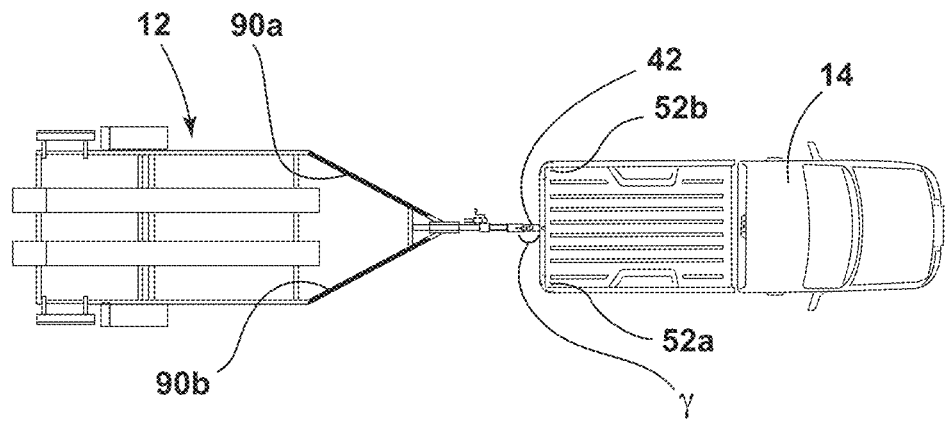

Once the false positive detections 94 are filtered out, the hitch angle detection routine 130 employs an occupancy grid map algorithm to generating a map of the detection points 92 from the measurement data from the rear radars 52a, 52b, which may be noisy and may include a relatively wide accuracy margin. The occupancy grid mapping algorithm results in hitch angle detection routine 130 creating a grid map 96a, 96b for each rear radar 52a, 52b and monitoring detection points 92 for each individual grid 96a, 96b, as shown in FIG. 7. The detection consistency (and/or the resulting persistency of detected points) translates to an occupancy probability associated with each grid 96a, 96b, which hitch angle detection routine 130 uses to determine occupancy of each grid 96a, 96b, as shown in FIG. 8. By identifying the more consistent positive detections 92, which indicate a higher probability of trailer detection, the hitch angle detection routine 130 extracts the trailer edges 90a, 90b from the occupancy grid map 96a, 96b, as shown in FIG. 13.

In one example of hitch angle detection routine 130, the occupancy grid map data 96a, 96b is populated (to derive the illustrated population grids 96a, 96b) using successive radar scans and continuing to receive the object point location data to construct a main 2-D sparse matrix $\overline{M}$ that represents the structure of the trailer in the moving grid maps 96a, 96b. To calculate $\overline{M}$, hitch angle detection routine 130 uses the linear system in the following equations:

$$\begin{bmatrix} M_1 \\ \vdots \\ M_N \end{bmatrix} = \begin{bmatrix} R(\gamma_1) \\ \vdots \\ R(\gamma_N) \end{bmatrix} \overline{M}, \quad (3)$$

$$\mathbb{M} = \mathbb{R} \cdot \overline{M}, \text{ were:} \quad (4)$$

M is dynamic positive detected point 92 locations in real-time;
$\overline{M}$=static detected positive detected point 92 locations at baseline; and
R=Rotation angle of positive detected point 92 locations relative to baseline.

With enough data, the solution of equation (4) can be calculated using the least square algorithm (pseudo-inverse) according to the equation:

$$\overline{M} = pinv(\mathbb{R}) \cdot \mathbb{M}. \quad (5)$$

Hitch angle detection routine 130 uses multiple scans during straight or near-straight, low-speed forward driving as an initial edge detection process before attempting to determine the hitch angle γ. With a sufficient number of scans it is possible to highlight the more persistent detection points 92, which can be associated with the respective edges 90a, 90b, making it possible to expand the matrix M by using interpolation to highlight the structure of the trailer and reduce the matrix sparseness.

In this respect it is noted that the hitch angle detection routine 130, configured as described, may balance the overall accuracy in detecting edges 90a, 90b in favor of maintaining a relatively higher detection threshold to reduce the computational load on microprocessor 84 in executing hitch angle detection routine 130. Accordingly, and to otherwise confirm acceptable detection of edges 90a, 90b, hitch angle detection routine 130 may operate with controller 28 to present overlayed lines representing the extracted edges 90a, 90b onto an image from the backup camera 50 (based on the grid map) and to ask the driver to confirm that the lines representing the detected edges 90a, 90b accurately lie on the trailer 12 image. If the driver does not confirm that the lines representing the detected edges 90a, 90b correctly lie on the trailer 12, the hitch angle detection routine 130 further reduces the detection threshold associated with rear radars 52a, 52b and repeats the above detection process. Once confirmed, the detected edges 90a, 90b are accepted and are coordinate-transformed to a central grid map 98 (FIG. 10) that places the edges 90a, 90b from the respective separate population grid maps 96a, 96b with reference to the right rear 52a and left rear 52b radars into a single frame of reference aligned with (or approximately aligned with) the hitch ball 40, as shown in FIG. 10. In this respect it is noted that, while a polar grid is illustrated, it is also possible to use a Cartesian coordinate system for the grid map. A multi-resolution grid map 98 is employed to increase the number of detections 92 in specific regions of interest. The region of interest covers the area were the trailer edges 90a, 90b are detected.

During the slow forward driving maneuver used to detect and locate the trailer edges 90a, 90b, hitch angle detection routine 130 also makes an initial determination of the hitch angle $\gamma$, which is close to, but may not always be exactly, zero. With additional reference to the kinematic model of FIG. 11, the hitch angle $\gamma$ is governed by the first-order dynamic equation (2). During the slow forward maneuvering, the angle can be approximated according to the equation:

$$\gamma = \frac{L-W}{W}\delta, \tag{6}$$

where $\gamma$ is the hitch angle and $\delta$ is the steering angle. This information can be used calibrate the matrix data from equations 3-5. Once the initial process is completed, including when hitch angle $\gamma$ is determined and the trailer edges 90a, 90b are detected, hitch angle detection routine 130 and system 10 ask the driver to start a reversing maneuver and executes a further process to continuously extract the hitch angle $\gamma$ from the data continuously received from the rear radars 52a, 52b during the reversing maneuver. In particular, hitch angle detection routine 130 solves the following linear system at each time-interval based radar scan t to derive the hitch angle from the previously-collected static points to the subsequent dynamic rotation points according to:

$$M_t = R(\gamma_t)\overline{M}, \tag{7}$$

where:

$$R(\gamma_t) = \begin{bmatrix} \cos\gamma_t & -\sin\gamma_t \\ \sin\gamma_t & \sin\gamma_t \end{bmatrix}$$

is the rotation matrix. In equation 7 the unknown variable is the hitch angle $\gamma$. The grid map $M_t$ of the actual trailer edge detections 92 remains static, and the grid map of the trailer edges at zero angle $\overline{M}$ is populated with each scan t.

To determine the rotation matrix $R(\gamma_t)$, hitch angle detection routine 130 first calculates a covariance matrix according to the following equation:

$$S = \overline{M} W M_t^T \tag{8}$$

where W is a weighting parameter and is calculated according to the following equation:

$$W = \text{diag}(\omega_1, \omega_2, \ldots, \omega_N). \tag{9}$$

Hitch angle detection routine 130 then calculates the singular value decomposition of the covariance matrix S according to the following equation:

$$S = U\Sigma V^T. \tag{10}$$

The rotation matrix is then populated according to:

$$R = V \begin{bmatrix} 1 & & & \\ & \ddots & & \\ & & 1 & \\ & & & \det(VU^T) \end{bmatrix} U^T. \tag{11}$$

By this computation, the hitch angle $\gamma$ is determined by:

$$\gamma_t = \tan^{-1}\left(\frac{R_{21}}{R_{11}}\right) \tag{12}$$

where:

$$R = \begin{bmatrix} R_{11} & R_{12} \\ R_{21} & R_{22} \end{bmatrix}.$$

As an alternative to the use of equations 11 and 12, hitch angle detection routine 130 can use an iterative closed points ("ICP") algorithm to determine the hitch angle $\gamma$. In such as scheme, the ICP algorithm is used to minimize the difference between two cloud points, and consists of two steps, including computing correspondences between the points and updating the transformation calculation. In either example, it is noted that the hitch angle detection routine 130 requires a minimum number of detected points 92 determined as being on the edges 90a, 90b of the trailer 12. Additional processing of the actual grid map $M_t$ can also be carried out to reduce the estimation error on the rotation matrix R.

As discussed above, the described process for determining the hitch angle $\gamma$ using the radar system 46 can, in one example, be used in connection with a system for automating or assisting in steering of the vehicle 14 during reversing of the vehicle 14 when coupled with the trailer 12. As can be appreciated, other instances exist that may utilize the measurement of the angle $\gamma$ of the trailer 12 relative to the vehicle 14, including trailer sway control or monitoring systems, that have applications in other driving use cases or scenarios. When used in a trailer backup assistance system 10, the functionality described above can be incorporated into the embodiment of the trailer backup assist system 10 illustrated in FIG. 2, wherein system 10 receives vehicle and trailer status-related information from additional sensors and devices (such system also being configurable with additional functionality leveraging the detected trailer angle γ, as needed and as would be understood in such applications). The information used by the system 10 of the present example includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles. Further aspects of such a system are described in detail in commonly-assigned U.S. Pat. No. 9,290,202, the entire disclosure of which is incorporated by reference herein.

Figure 11:
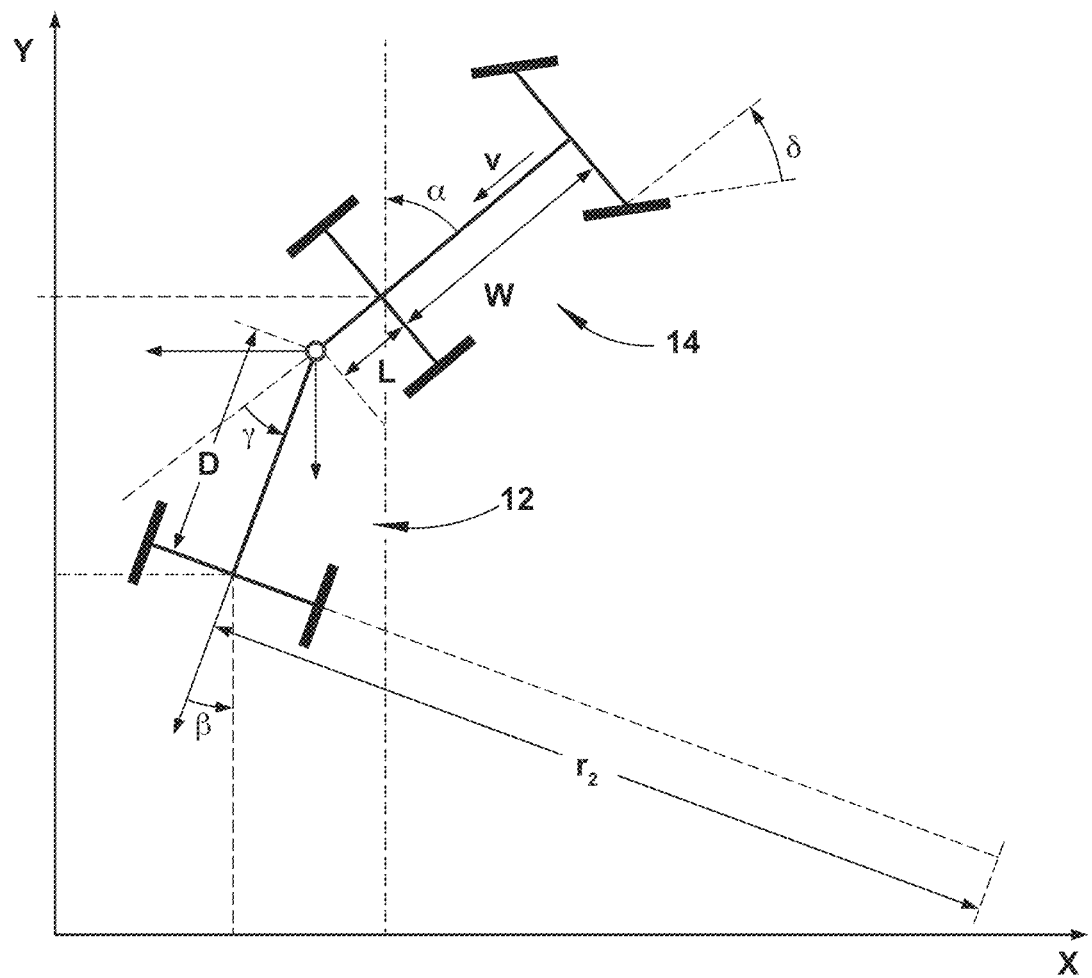
FIG. 11 is a schematic diagram that illustrates the geometry of a vehicle and a trailer overlaid with a two-dimensional x-y coordinate system, identifying variables used to determine a kinematic relationship of the vehicle and the trailer for use of the radar-based trailer angle detection system in connection with the vehicle control system, according to one embodiment of the disclosure.
Figure 12:
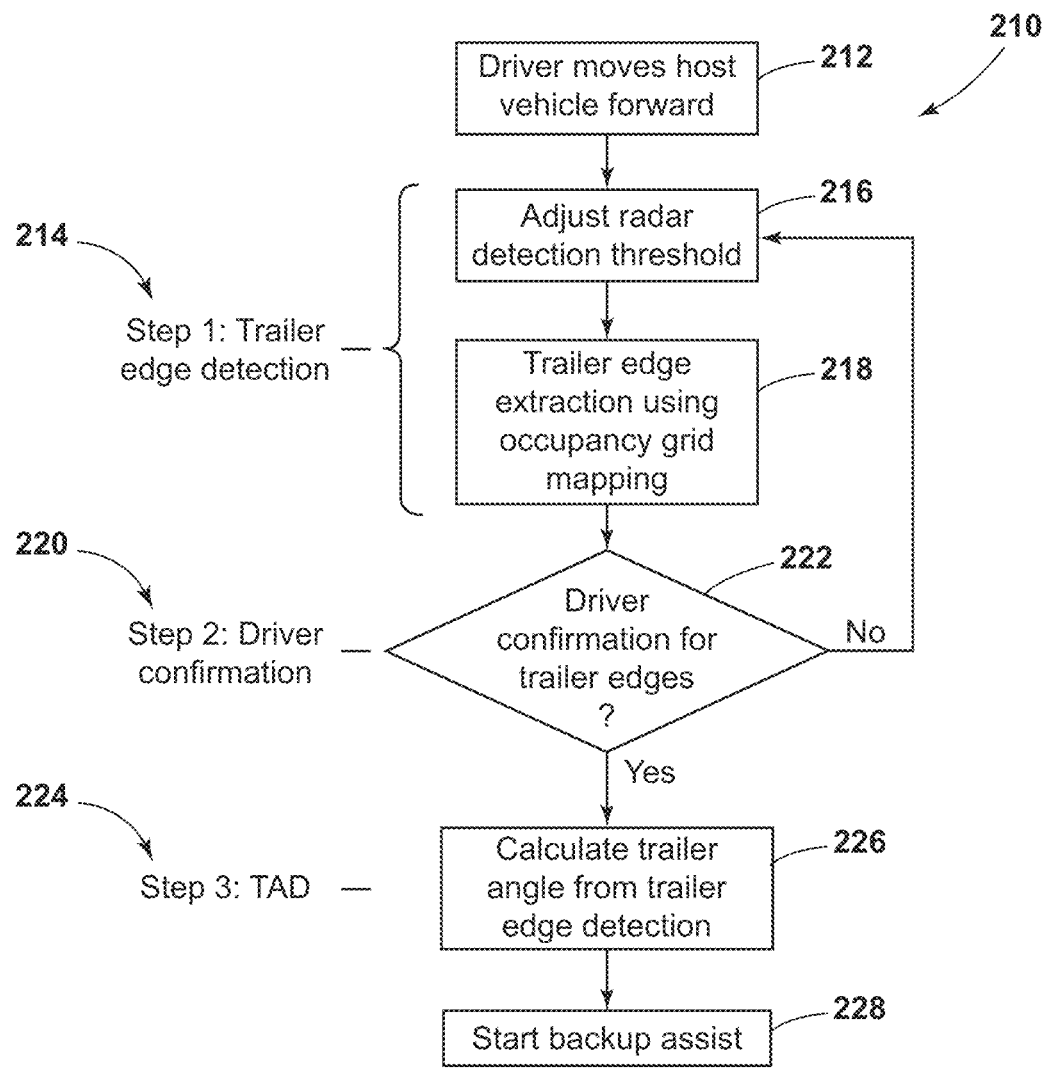
FIG. 12 is a flowchart illustrating steps in a method for implementing the sequence of using the edge point detection to determine the angle of the trailer relative to the vehicle.

With particular reference to FIG. 11, the trailer angle γ determined using radar system 46 can be used as an input to a control algorithm (e.g., curvature routine 98) that uses vehicle and trailer information and parameters to calculate a kinematic relationship between a curvature of a path of travel of the trailer 12 and the steering angle of the vehicle 14 towing the trailer 12, which can be desirable for a trailer backup assist system configured in accordance with some embodiments, including for use by a curvature routine 98 of the controller 28 in one embodiment. As shown in FIG. 11, for a system defined by a vehicle 14 and a trailer 12, the kinematic relationship is based on various parameters associated with the vehicle 14 and the trailer 12. These parameters include:

δ: steering angle at steered front wheels 64 of the vehicle 14;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K) \quad (14)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via a steering input device. As discussed above, the present example is considered non-limiting with respect to specific applications and use of the trailer angle detection system described herein. Accordingly, it would be understood that various additional applications of the system are possible. With reference to FIG. 15 a method for determining the hitch angle γ using the data obtained from radar system 46, including rear radar units 52a, 52b in the present example, is depicted. As can be appreciated by the above description with respect to FIG. 11, the illustrated hitch angle detection method can be used within a method for reversing a trailer that includes controlling the steering system 62 of the vehicle 14 using the determined hitch angle γ (i.e., the angle of the trailer 12 with respect to the vehicle 14) in the kinematic model (FIG. 11) of the vehicle 14 and trailer 12 combination to maintain the vehicle 14 along backing path. As discussed above, the method 210, as implemented by system 10 can begin with a request (step 212) for the driver to move the vehicle forward. When such a maneuver is confirmed as being carried, out system 10 executes the initial trailer edge detection process discussed above with respect to FIGS. 4-9 and using, for example, equations 1-6 (step 214). As discussed, the edge detection process includes adjusting the detection threshold used in processing the data received from radar units 52a, 52b (step 216) and using successive radar scans to extract the points 92 corresponding with the trailer edges 90a, 90b (step 218). The detected edges 90a, 90b are then presented to the user for confirmation (step 220). If the edges 90a, 90b are not confirmed (step 222), the system 10 re-adjusts the radar detection threshold (step 216) and re-executes the edge detection process (step 218). Once the detected edges 90a, 90b are confirmed (step 222), the system 10 uses the radar data in connection with equation 7 to determine the hitch angle γ (steps 224, 226), which allows for continued use of the radar data to determine the hitch angle γ on a continuous basis. Subsequently, system 10 is configured to use hitch angle detection routine 130 to use continuous, successive radar scans to monitor the hitch angle γ according to equations 7-11, which permits reverse maneuvering of trailer 12 and vehicle 14 according to the control methodology discussed above with respect to FIGS. 11-14 and using operating routine 132 (step 228).

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A trailer detection system for a vehicle, comprising:
   a radar system outputting object point location data to a rear of the vehicle;
   a vehicle steering system; and
   a controller receiving the object point location data from the radar system and:
     during non-trailering driving of the vehicle, using the object point location data to detect objects by processing the object point location data at a first predetermined detection threshold configured to detect objects including cars and people with a surface area open to the vehicle;
     in a trailer angle detection routine during trailering driving of the vehicle:
       monitoring a position of an edge of a trailer relative to the vehicle by continuously processing the object point location data from the radar system at a second predetermined detection threshold lower than the first detection threshold and configured to detect trailer edges on surfaces open away from the vehicle to derive additional detection points relative to a number of points derived using the first threshold and filtering out object point location data not correlated with the edge of the trailer based on object point location data persistence during driving of the vehicle;
       correlating the determined position of the edge of the trailer relative to the vehicle to determine an angle of the trailer relative to the vehicle about a coupling point, at which the trailer is coupled with the vehicle, over successive radar scans on a continuous basis; and
       controlling the steering system of the vehicle using the angle of the trailer in a kinematic model of the vehicle and trailer combination to steer the vehicle along a backing path.

2. The system of claim 1, wherein the backing path corresponds with a user-commanded curvature of the vehicle and trailer.

3. The system of claim 1, wherein the radar system includes a first radar unit mounted on a rear of the vehicle.

4. The system of claim 3, wherein:
   the first radar unit is mounted on a right side of the rear of the vehicle; and
   the radar system further includes a second radar unit mounted on a left side of the rear of the vehicle.

5. The system of claim 4, wherein the controller:
   detects points along the edge of the trailer using the first and second radar units;
   establishes locations of the points within first and second coordinate systems associated respectively with the first and second radar units; and
   uses the locations of the points within the first and second coordinate systems to establish locations for the points in a third coordinate system aligned with a hitch ball of the vehicle.

6. The system of claim 5, wherein at least the first and second coordinate systems are population grids.

7. The system of claim 1, wherein the controller correlates the determined position of the edge of the trailer relative to the vehicle to determine the angle of the trailer relative to the vehicle about the coupling point by:
   populating a first matrix of static object location points corresponding with the edge of the trailer relative to the vehicle when the angle is known to be zero;
   continuing to receive the object point location data and determining the position of the edge of the trailer relative to the vehicle when the angle is not known to be zero and populating a second matrix of dynamic object location points corresponding with the edge of the trailer relative to the vehicle; and
   using the first and second matrices to calculate a rotation matrix for the static rotation points to the dynamic rotation points.

8. The system of claim 7, wherein the rotation matrix is processed to derive the angle.

9. The system of claim 1, wherein the controller receives the object point location data and determines the position of the edge of the trailer relative to the vehicle and correlates the determined position of the edge of the trailer relative to the vehicle to determine the angle of the trailer relative to the vehicle during forward driving at a vehicle speed of less than 10 miles per hour.

10. A method for determining a trailer position relative to a vehicle, comprising:
    during non-trailering driving of the vehicle, receiving object point location data from a radar system useable at a first detection threshold to detect objects including cars and people; and
    in a trailer angle detection routine during trailering driving of the vehicle:
      determining a position of an edge of the trailer relative to the vehicle by processing the object point location data from the radar system at a second detection threshold lower than the first detection threshold and configured to detect objects including portions of a trailer to derive additional detection points relative to a number of points derived using the first threshold and filtering out object point location data not correlated with the edge of the trailer based on object point location data persistence during driving of the vehicle;

correlating the determined position of the edge of the trailer relative to the vehicle to determine an angle of the trailer relative to the vehicle about a coupling point at which the trailer is coupled with the vehicle; and controlling a steering system of the vehicle using the angle of the trailer in a kinematic model of the vehicle and trailer combination to maintain the vehicle along a backing path.

11. The method of claim 10, wherein:

receiving object point location data, determining the position of the edge of the trailer, and determining the angle of the trailer relative to the vehicle is initially carried out during an initial edge detection process during straight driving at a vehicle speed of less than 10 miles per hour; and the initial edge detection process is completed prior to controlling a steering system of the vehicle to maintain the vehicle along a backing path.

12. The method of claim 11, wherein controlling the steering system of the vehicle to maintain the vehicle along the backing path also includes:

receiving object point location data, determining the position of the edge of the trailer, and determining the angle of the trailer relative to the vehicle.

13. The method of claim 10, wherein:

receiving the object point location data from the radar system and determining the position of the edge of the trailer relative to the vehicle includes detecting points along the edge of the trailer using first and second radars in the radar system and determining locations of the points within first and second coordinate systems associated respectively with the first and second radars; and correlating the determined position of the edge of the trailer relative to the vehicle to determine the angle of the trailer relative to the vehicle about the coupling point includes using the locations of the points within the first and second coordinate systems to establish locations for the points in a third coordinate system aligned with a hitch ball of the vehicle and included in the coupling point.

14. The method of claim 10, wherein correlating the determined position of the edge of the trailer relative to the vehicle to determine the angle of the trailer relative to the vehicle about the coupling point includes:

populating a first matrix of static object location points corresponding with the edge of the trailer relative to the vehicle when the angle is known to be zero;

continuing to receive the object point location data and determining the position of the edge of the trailer relative to the vehicle when the angle is not known to be zero and populating a second matrix of dynamic object location points corresponding with the edge of the trailer relative to the vehicle;

using the first and second matrices to calculate a rotation matrix for the static rotation points to the dynamic rotation points; and processing the rotation matrix is to derive the angle.

15. A vehicle, comprising:

a radar system outputting object point location data to a rear of the vehicle; and a controller:

receiving the object point location data and determining the position of an edge of the trailer relative to the vehicle by:

processing the object point location data from the radar system at a first detection threshold configured to detect objects including cars and people with a surface area open to the vehicle and determining, based on the processing, a number of detected points to be insufficient to detect an edge of the trailer; and processing the object point location data from the radar system at a second detection threshold lower than the first threshold and configured to detect trailer edges on surfaces open away from the vehicle, and filtering out object point location data not correlated with the edge of the trailer based on object point location data persistence during driving of the vehicle; and correlating the determined position of the edge of the trailer relative to the vehicle to determine an angle of the trailer relative to the vehicle about a coupling point, at which the trailer is coupled with the vehicle, over successive radar scans on a continuous basis.

16. The vehicle of claim 15, further including a steering system, wherein:

the controller further controls the steering system of the vehicle using the angle of the trailer in a kinematic model of the vehicle and trailer combination to maintain the vehicle along a backing path.

17. The vehicle of claim 15, wherein:

the radar system includes a first radar unit mounted on a right side of the rear of the vehicle and a second radar unit mounted on a left side of the rear of the vehicle; and the controller:

detects points along the edge of the trailer using the first and second radars;

establishes locations of the points within first and second coordinate systems associated respectively with the first and second radars; and uses the locations of the points within the first and second coordinate systems to establish locations for the points in a third coordinate system aligned with a hitch ball of the vehicle.

18. The vehicle of claim 15, wherein the controller correlates the determined position of the edge of the trailer relative to the vehicle to determine the angle of the trailer relative to the vehicle about the coupling point by:

populating a first matrix of static object location points corresponding with the edge of the trailer relative to the vehicle when the angle is known to be zero;

continuing to receive the object point location data and determining the position of the edge of the trailer relative to the vehicle when the angle is not known to be zero and populating a second matrix of dynamic object location points corresponding with the edge of the trailer relative to the vehicle;

using the first and second matrices to calculate a rotation matrix for the static rotation points to the dynamic rotation points; and processing the rotation matrix to derive the angle.

* * * * *